United States Patent
Juels

(10) Patent No.: US 8,850,609 B1
(45) Date of Patent: Sep. 30, 2014

(54) CONDITIONAL INTEGRATION OF A SATELLITE DEVICE INTO AN AUTHENTICATION PROCESS INVOLVING A PRIMARY DEVICE

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 80 days.

(21) Appl. No.: 13/625,480

(22) Filed: Sep. 24, 2012

(51) Int. Cl.
*G06F 11/30* (2006.01)

(52) U.S. Cl.
USPC .......................................... 726/34; 713/194

(58) Field of Classification Search
None
See application file for complete search history.

(56) References Cited

U.S. PATENT DOCUMENTS

| | | | |
|---|---|---|---|
| 7,221,928 B2 * | 5/2007 | Laird et al. | 455/404.1 |
| 8,106,752 B2 * | 1/2012 | Golden | 340/426.11 |
| 2013/0212713 A1 * | 8/2013 | Boldyrev et al. | 726/34 |

* cited by examiner

Primary Examiner — Pramila Parthasarathy
(74) Attorney, Agent, or Firm — Ryan, Mason & Lewis, LLP

(57) ABSTRACT

A processing device comprising a processor coupled to a memory is configured to determine a risk of simultaneous theft of a primary device and at least one satellite device associated with the primary device, and to identify said at least one satellite device as an appropriate authentication factor for use in an authentication process involving the primary device, based at least in part on the determined risk. The identified satellite device may serve as an additional or alternative authentication factor relative to one or more other authentication factors. The processing device may comprise the primary device itself, or another separate device, such as an authentication server that also participates in the authentication process. Information associated with the identified satellite device is utilized in the authentication process to authenticate a user of the primary device.

26 Claims, 2 Drawing Sheets

CONDITIONAL INTEGRATION OF A SATELLITE DEVICE INTO AN AUTHENTICATION PROCESS INVOLVING A PRIMARY DEVICE

FIELD

The field relates generally to information security, and more particularly to techniques for providing secure access to protected resources.

BACKGROUND

Numerous techniques are known for providing secure access to protected resources. One widely-used approach involves the use of one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Although the above-described two-factor authentication based on token passcodes and PINS can provide adequate security in many applications, a need remains for further improvements.

SUMMARY

Utilization of additional or alternative authentication factors can provide a higher level of security in an authentication process. For example, a user equipped with primary device such as a mobile telephone often also carries or interacts with a wide variety of other wired or wireless devices, also referred to herein as "satellite devices," some of which could serve as additional or alternative authentication factors in an authentication process. However, the various devices associated with the user can be susceptible to simultaneous theft, which undermines their effectiveness as separate authentication factors. Thus, by way of example, a mobile phone is vulnerable to simultaneous theft with an associated Bluetooth headset, such that these devices may not be effective as separate authentication factors.

Illustrative embodiments of the present invention provide techniques for conditional integration of one or more satellite devices as authentication factors in an authentication process involving a primary device. This considerably facilitates the use of the satellite devices as effective authentication factors, and improves the overall security of the corresponding authentication process.

In one embodiment, a processing device comprising a processor coupled to a memory is configured to determine a risk of simultaneous theft of a primary device and at least one satellite device associated with the primary device, and to identify said at least one satellite device as an appropriate authentication factor for use in an authentication process involving the primary device, based at least in part on the determined risk. The identified satellite device may serve as an additional or alternative authentication factor relative to one or more other authentication factors. The processing device may comprise the primary device itself, or another separate device, such as an authentication server that also participates in the authentication process. Information associated with the identified satellite device is utilized in the authentication process to authenticate a user of the primary device.

The illustrative embodiments can be configured to overcome one or more drawbacks of conventional practice by providing an accurate assessment of the risk of simultaneous theft of a primary device and its associated satellite devices before a given one of the satellite devices is utilized as an authentication factor.

DETAILED DESCRIPTION

Illustrative embodiments of the present invention will be described herein with reference to exemplary communication systems and associated primary devices, satellite devices, authentication servers and other processing devices. It is to be appreciated, however, that the invention is not restricted to use with the particular illustrative system and device configurations shown.

Accordingly, the term "communication system" as used herein is intended to be broadly construed, so as to encompass, for example, systems in which multiple processing devices communicate with one another over one or more networks.

The term "primary device" is similarly intended to be broadly construed herein, and may encompass, for example, a computer, mobile telephone or other processing device. Such a device may incorporate or be otherwise associated with an authentication token of a corresponding user.

The term "satellite device" is also intended to be broadly construed herein, and may encompass, for example, any type of processing device that is associated with and configured to communicate with a primary device.

The term "server" as used herein is also intended to be construed broadly, so as encompass not only network-based servers but also numerous other types of devices that can be arranged with one or more other devices to perform authentication operations in the manner disclosed herein. A given such server therefore need not be a network-based server, and may be implemented as a portion of a device that performs other functions, as a combination of a plurality of devices, or in other forms.

As will be described, illustrative embodiments of the present invention provide functionality for conditional integration of one or more satellite devices into an authentication process involving a primary device.

Figure 1:
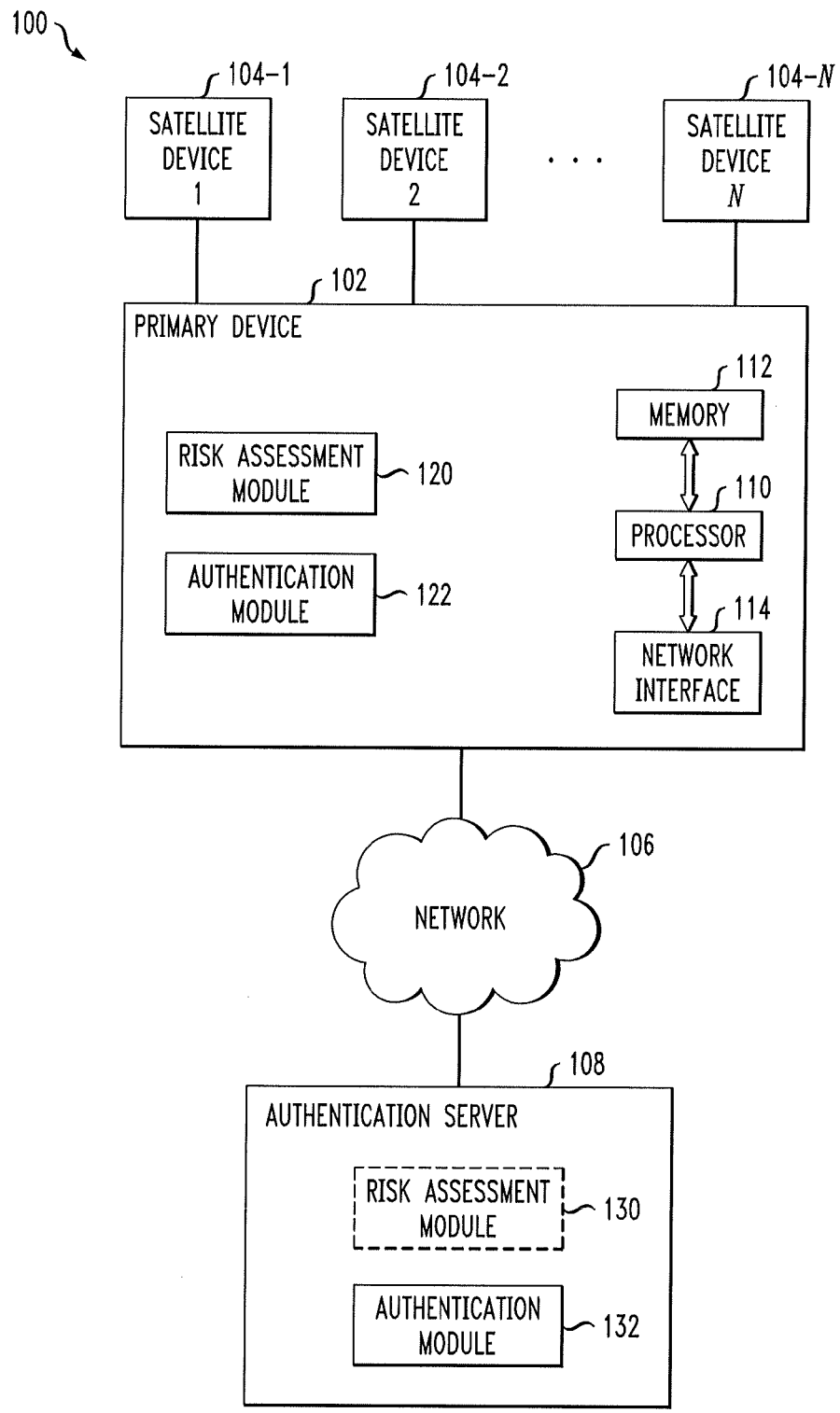
FIG. 1 is a block diagram of a communication system that incorporates functionality for conditional integration of satellite devices into an authentication process in an illustrative embodiment of the invention.

FIG. 1 shows a communication system 100 that incorporates such functionality in an illustrative embodiment. The system 100 comprises a primary device 102 that is configured to communicate with a plurality of satellite devices 104-1, 104-2, . . . 104-N over respective wired or wireless connections. The primary device 102 is also configured to communicate over a network 106 with an authentication server 108.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Although not expressly illustrated as such in the figure, certain ones of the connections over which the primary device 102 communicates with its satellite devices 104 may also pass through network 106. Also, although shown as being separate from one another in this embodiment, the primary device 102 and one or more of the satellite devices 104 in other embodiments may be implemented on a common processing platform.

The primary device 102 and its satellite devices 104 may be associated with a particular system user. The term "user" as utilized herein is intended to be broadly construed so as to encompass, for example, a human user associated with a given device or set of devices, an automated user such as an application or other hardware or software component associated with one or more devices, or any other entity that may trigger generation of a request for a protected resource in system 100.

The primary device 102 may be viewed as an example of what is more generally referred to herein as a "processing device." The primary device in this embodiment may comprise, for example, a computer, a mobile telephone or another type of communication device.

The satellite devices 104 may comprise, for example, wireless headsets, input-output devices such as speakers, a keyboard or a mouse, external or implanted physiological sensors such as heart rate monitors or fitness monitors, digital music players, wireless access points, locator tags, and numerous other devices that are typically used in conjunction with another device rather than in a stand-alone configuration. Satellite devices of this type may belong to the same system user that is associated with the primary device or will at least typically reside in an environment familiar to that user.

As will be described in detail below, embodiments of the invention involve performing risk assessments to determine conditions under which it would be appropriate to use such satellite devices as authentication factors in an authentication protocol that involves the primary device. For example, under appropriate conditions for which risk of simultaneous theft has been computed and determined to be below a specified threshold, a given satellite device can be utilized in conjunction with the primary device as an additional "something you have" authentication factor. In arrangements of this type, and again by way of example only, a Bluetooth headset might serve as a satellite device authentication factor for a primary device comprising a mobile telephone, or a mobile telephone might serve as a satellite device authentication factor for a primary device comprising a tablet computer. Numerous other combinations of primary and satellite devices are possible.

Like the primary device, one or more of the satellite devices 104 and the server 108 may comprise respective processing devices. A given such processing device generally comprises at least one processor and an associated memory, and implements one or more functional modules for controlling certain features of the system 100. The system 100 in the present embodiment implements one or more authentication processes in order to control user access to protected resources.

The primary device 102 in the present embodiment more particularly comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the primary device 102 is network interface circuitry 114. The network interface circuitry 114 allows the primary device 102 to communicate over the network 106 with the server 108, and may comprise one or more conventional transceivers. Such transceivers may also be used to support communication between the primary device 102 and one or more of its satellite devices 104. As indicated above, the primary device 102 may communicate with its satellite devices 104 via respective wired or wireless connections, and one or more such connections may pass through the network 106. The wired or wireless connections may use a wide variety of different types of wired or wireless communication protocols, including, for example, near field communication (NFC) protocols such as Bluetooth, and wireless networking protocols such as WiFi and WiMAX.

The satellite devices 104 and server 108 may each include processor, memory and network interface components similar to those of the primary device 102, although such components are not explicitly shown in the figure.

The primary device 102 further comprises a risk assessment module 120 and an authentication module 122. These modules 120 and 122 may each be implemented at least in part in the form of software that is stored in memory 112 and executed by processor 110 of the primary device 102.

The risk assessment module 120 is configured to determine a risk of simultaneous theft of the primary device 102 and at least a subset of the satellite devices 104 associated with the primary device, and to identify one or more of the satellite devices in the subset as appropriate authentication factors for use in an authentication process involving the primary device, based at least in part on the determined risk. Any of the satellite devices that are identified as appropriate authentication factors based on the determined risk may be integrated into an authentication process involving the primary device, such that information associated with the identified satellite device or devices is utilized in the authentication process to authenticate a user of the primary device.

As will be described in greater detail below, determining the risk of simultaneous theft of the primary device 102 and at least one satellite device 104 associated with the primary device may comprise determining a risk score indicative of a likelihood of simultaneous theft of the primary device and the satellite device. Separate risk scores of this type may be determined for each of the satellite devices.

Although the risk assessment module 120 is implemented in primary device 102 in the present embodiment, this is by way of illustrative example only. In other embodiments, the risk assessment module 120 may be replaced by or may operate in conjunction with a similar risk assessment module 130 implemented in the authentication server 108. Accordingly, risk assessment module 130 may be viewed as a replacement module in an embodiment in which the primary device does not include its own risk assessment module, or may be viewed as an optional complementary module in an embodiment such as that shown in FIG. 1 where the primary device 102 does include its own risk assessment module 120. The risk assessment module 130 of the authentication server 108 is therefore shown in dashed outline in the FIG. 1 embodiment.

The authentication module 122 of the primary device 102 interacts with a corresponding authentication module 132 of the authentication server 108 in order to carry out an authentication process. For example, authentication information may be exchanged between the primary device 102 and the authentication server 108 via these modules. Such authentication information may include passcodes or information associated with challenge-response protocols. The authentication process may be used to control user access to protected resources, such as files or other data stored on one or more additional system servers or associated processing devices. Embodiments of the present invention are not limited in terms of the type of protected resources for which security is provided using the authentication processes. Other examples of protected resources may include key shares, or physical devices and applications, in addition to or in place of the above-noted files or other data. A protected resource may additionally or alternatively comprise a permission to modify a particular setting in a physical control system or other type of system.

It should also be noted that an authentication process may involve, for example, user authentication to the primary device itself, user authentication to a service running on or accessed by the primary device, as well as other types of authentication.

Examples of conventional authentication processes that may be adapted for use in embodiments of the present invention are disclosed in A. J. Menezes et al., Handbook of Applied Cryptography, CRC Press, 1997, which is incorporated by reference herein. These and other conventional processes, being well known to those skilled in the art, will not be described in further detail herein, although embodiments of the present invention may incorporate aspects of such processes.

It is to be appreciated that the particular set of elements shown in FIG. 1 for providing conditional integration of satellite devices into an authentication process involving a primary device is presented by way of example, and in other embodiments additional or alternative elements may be used. Thus, another embodiment may include additional networks and additional sets of primary devices, satellite devices, servers, or other types and arrangements of processing devices.

As mentioned previously, various elements of system 100 such as portions of primary device 102, satellite devices 104 and authentication server 108 or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Such processing platforms may comprise cloud infrastructure including a plurality of virtual machines implemented using one or more associated hypervisors. Thus, for example, system elements such as primary device 102 and authentication server 108 may each be implemented as one or more virtual machines.

An example of a commercially available hypervisor platform that may be used to implement a hypervisor and possibly other portions of the cloud infrastructure of a given communication system such as system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of cloud infrastructure in a system such as system 100.

Figure 2:
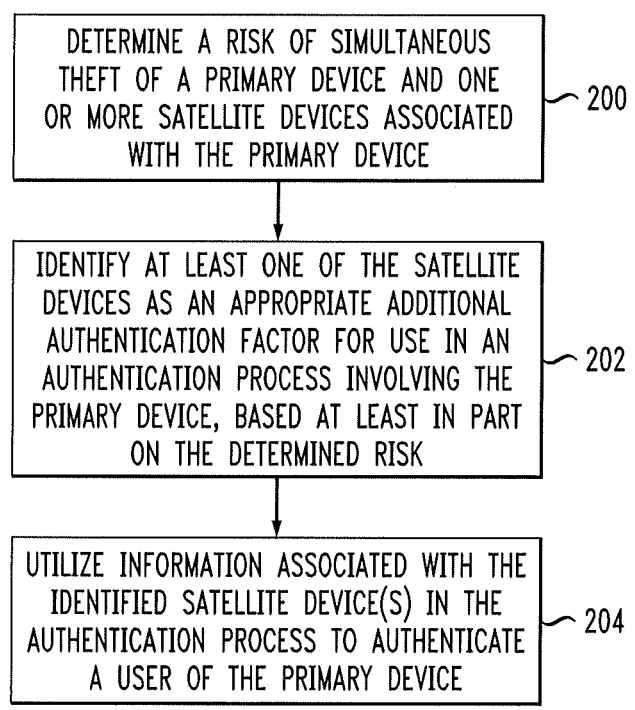
FIG. 2 is a flow diagram showing one exemplary technique for conditional integration of satellite devices into an authentication process as implemented in the FIG. 1 system.

Referring now to FIG. 2, a flow diagram is shown of one exemplary technique for conditional integration of one or more of the satellite devices 104 into an authentication process involving the primary device 102. The technique in this embodiment includes steps 200 through 204. Steps 200 and 202 may be performed by the primary device 102, the authentication server 108, or by a combination of both of these devices. Step 204 is assumed to be performed by the authentication server 108. It should be understood, however, that additional or alternative processing steps, possibly performed by other arrangements of devices, may be used in other embodiments. Also, the ordering of the steps can be varied, and steps indicated as being performed serially in the FIG. 2 embodiment may be performed at least in part in parallel with each other in other embodiments.

Step 200 determines a risk of simultaneous theft of the primary device 102 and one or more of the satellite devices 104 associated with the primary device. As noted above, determining the risk of simultaneous theft of the primary device 102 and at least one satellite device 104 associated with the primary device may comprise determining a risk score indicative of a likelihood of simultaneous theft of the primary device and the satellite device. Separate risk scores of this type may be determined for each of the satellite devices 104. In addition, a composite risk score may be determined for multiple ones of the satellite devices using their respective separate risk scores.

Determining risk of simultaneous theft of the primary device 102 and a given one of the satellite devices 104 may comprise classifying the satellite device, such as by product type and model, characterizing an operational history of the satellite device, or other risk assessment processes or combinations thereof.

With regard to device classification, the respective functions of a satellite device and its associated primary device are often good indicators of the likelihood of simultaneous physical compromise. For example, if the satellite device is a wireless external physiological sensor and the primary device is a mobile telephone, they are unlikely, in the normal course of use, to be stolen together. The satellite device in this example is typically worn on the body, while the mobile telephone is typically carried in a bag or a pocket of a garment. In contrast, it is common for a satellite device comprising a Bluetooth headset and a primary device comprising a mobile telephone to be carried together in the same bag or garment.

In many instances, the primary device will be self-classifying. This is true, for example, in an embodiment in which the authentication functionality runs on the primary device, and is therefore aware of the primary device type.

The satellite device can be classified using a variety of different techniques. For example, it may be classified based on its communication with a particular application or service, as in the case of a fitness monitor that communicates with a local fitness application running on a mobile telephone or a remote fitness service running on a server accessible via a network. As another example, a given satellite device may output a device type or a serial number that may be used in a lookup process to classify the device. It is also possible to classify the device by user query, as in an arrangement in which the user is asked to identify the device type, device functionality or other device characteristic. Typically, a given satellite device need only be classified once, for example, during a pairing or registration phase, for use with a given primary device.

With regard to operational history characterization, the history of use of the satellite and mobile devices can provide insight into the likelihood of simultaneous theft. For example, if a physiological sensor has transmitted the pulse of a user continuously over the course of a day, then it may be concluded that the device is being worn by the user, and thus that theft simultaneous with a mobile phone is unlikely.

The operational history of a satellite device may be characterized in terms of any of several behaviors, including, for example, communication patterns and communication targets. Communication patterns may comprise a record of signal transmissions from the satellite device to the primary device over a particular time period, while the communication targets generally identify the applications or services with which the satellite device is communicating. Operational history can also be characterized using active querying of the satellite device by the primary device. By way of example, such active querying may be used by the primary device to determine whether the satellite device is turned on or otherwise active, the types of activities the satellite device is currently engaged in, as well as its power level or other status indicators, and its physical position, orientation or other characteristics as determined from received signal strength (RSSI).

Accordingly, step 200 may be viewed as involving an assessment of the vulnerability of at least a given one of the satellite devices to theft alongside its associated primary device, or in other words, the risk of simultaneous theft of these two devices, over a recent period of time or another particular period of time.

Also, analysis used to determine risk scores may be performed in one period of time while the resulting risk scores are considered valid for a different period of time. For example, a given risk score may be generated based on analysis that takes place within a first time interval [T, T+A] and may be treated as valid over a second time interval [T+A, T+A+B], where T, A and B denote specified time parameters. Decoupling periods of analysis and validity in this manner prevents an attacker from manipulating a period of analysis to make a device appear theft-resistant when it is not, while also providing a user with a certain amount of time to detect theft of the devices.

Step 202 identifies at least one of the satellite devices 104 as an appropriate additional authentication factor for use in an authentication process involving the primary device 102, based at least in part on the determined risk from step 200. Accordingly, this embodiment assumes that there are other authentication factors, and the identified satellite device is utilized as an additional authentication factor. Other embodiments may utilize a given identified satellite device as an alternative authentication factor, replacing one of multiple other authentication factors that would otherwise be utilized, or as a single authentication factor in a given authentication process.

By way of example, identifying at least one of the satellite devices 104 as an appropriate additional authentication factor in step 202 may comprise identifying any of multiple satellite devices having respective risk scores that exceed respective specified thresholds as appropriate additional authentication factors for use in the authentication process. Each of the risk scores may be compared against a different threshold specified for the corresponding satellite device, or the same threshold may be used for all of the risk scores. In an embodiment in which the risk scores for the respective satellite devices are combined into a composite risk score, identifying at least one satellite device as an appropriate additional authentication factor may more particularly involve comprises identifying all of the satellite devices as appropriate additional authentication factors for use in the authentication process if the composite risk score exceeds a specified threshold.

Step 204 utilizes information associated with the identified satellite device(s) 104 in the authentication process to authenticate a user of the primary device 102. As noted above, information from any of the satellite devices that is so identified can be utilized as part of an authentication protocol. Thus, for example, information associated with the identified satellite device or devices may include at least one of a credential released by a given satellite device, an output of a cryptographic function performed by the given device, and presence information of the given device. Numerous other types of information associated with identified satellite device or devices may be utilized when integrating the identified satellite device or devices as an additional authentication factor into the authentication process.

A number of examples will now be described to illustrate possible implementations of the FIG. 2 process.

In a first example, a user wears a Bluetooth-enabled heart rate monitor. This satellite device may be implemented in the form of a wristwatch and communicates with a primary device in the form of a mobile telephone. The mobile telephone classifies the satellite device as a heart rate monitor during an initial mobile-to-wristwatch Bluetooth pairing by querying the user as to the satellite type. The mobile telephone may be instrumented to unlock when the Bluetooth-enable heart rate monitor, and no other satellite device, is available, if the user authenticated to the mobile device using a PIN at time T, the heart rate monitor has presented a heart rate continuously since time T, and analysis of an RSSI of the heart rate monitor indicates that it has been within five feet of the mobile device since time T. Of course, numerous other authentication policies relying on information from one or more satellite devices may be used to unlock the primary device. The use of the heart rate monitor information in this example may be a replacement for other authentication factors, such as presentation of a biometric or inputting of a PIN.

Alternatively, the heart rate monitor information may be used in conjunction with these other authentication factors.

The above example does not incorporate use of explicit risk scores. However, as described previously herein, a given embodiment may generate risk scores for respective satellite devices each indicative of risk of simultaneous theft of the primary device and the corresponding satellite device.

In a second example, explicit risk scores of this type are utilized. Assume that the user has as a primary device a tablet computer. The tablet computer is instrumented to permit banking transactions only when the combined risk scores of two satellite devices exceed a threshold. The risk scores for the two satellite devices are denoted $s_1$ and $s_2$ respectively and each is defined on an interval [0,1], where in the present example a risk score of 0 indicates a high risk of simultaneous theft and a risk score of 1 indicates a low risk of simultaneous theft. The threshold is denoted $\delta$ and assume in the present example that $\delta$ is specified as having the value 1.1, such that the tablet computer will allow the user to perform a banking transaction only if the risk assessment indicates that $s_1+s_2>\delta=1.1$. The two satellite devices more particularly comprise a home-based wireless music playback system and a Bluetooth locator tag on a backpack.

One evening, while visiting a downstairs neighbor, the user attempts to perform a banking transaction on the tablet computer. The tablet computer detects the music playback system through the ceiling, but its RSSI is weak, leading to a depressed risk score of 0.6. The backpack, however, is nearby to the user. Over the past day, the tablet computer has detected a significant distance from the backpack while the tablet computer was not in use, suggesting that the user has not placed the tablet computer in the backpack. This observation yields a low risk score of 0.7. Thus, $s_1+s_2=1.3>\delta=1.1$, and the tablet computer allows the user to perform the banking transaction.

As indicated previously, satellite devices may be configured to release credentials only when these devices detect conditions suggesting simultaneous-theft resistance. In this case, resource access by the primary device may be not just a function of local policy, but a function of the availability of credentials.

In a third example, one possible implementation of this credential release feature is utilized. Assume that a user wears a satellite device in the form of a fitness monitor that releases a secret key is to a primary device in the form a tablet computer only when the fitness monitor has detected a pulse continuously for the past three hours. Files stored on the tablet computer are encrypted under the secret key $\kappa$ and the tablet computer can thus access the encrypted files only when authorized by the fitness monitor under its pulse-detection policy. It should be noted that one or more other authentication factors may be used in this particular example as well as in the other examples described above.

The particular processing operations and other system functionality described in conjunction with the diagram of FIG. 2 are presented by way of illustrative example only, and should not be construed as limiting the scope of the invention in any way. A wide variety of alternative arrangements are possible. For example, as previously noted, risk assessments of the type described herein can be performed by a risk assessment module implemented in the authentication server 108 or another server, instead of in the primary device 102. As a more particular example of such an arrangement, the primary device might forward a product identification string harvested from a Bluetooth device to a server to look up in on online marketplace in order to determine the device type.

It is to be appreciated that functionality for conditional integration of satellite devices into authentication processes as described in conjunction with the diagram of FIG. 2 can be implemented at least in part in the form of one or more software programs stored in memory and executed by a processor of a processing device such as a computer or server. As mentioned previously, a processing device memory or other storage device having such program code embodied therein is an example of what is more generally referred to herein as a "computer program product."

The embodiments described in conjunction with FIGS. 1 and 2 can provide a number of significant advantages relative to conventional practice. For example, by providing an accurate assessment of the risk of simultaneous theft of a primary device and each of its associated satellite devices, the particular satellite device or devices that are appropriate for authentication factor use can be determined, thereby allowing for a more secure authentication process than would otherwise be possible.

It should again be emphasized that the above-described embodiments of the invention are presented for purposes of illustration only. Many variations and other alternative embodiments may be used. For example, the techniques are applicable to a wide variety of other types of systems and processing devices that can benefit from the enhanced resource protections provided by conditional integration of satellite devices into authentication processes as disclosed herein. Also, the particular configurations of elements shown in FIG. 1 and the authentication process shown in FIG. 2 can be varied in other embodiments. For example, parameters such as the number and type of risk assessments, risk scores, thresholds and policies used and the particular system entities involved in a given authentication process can be varied in other embodiments. These and numerous other alternative embodiments within the scope of the appended claims will be readily apparent to those skilled in the art.

What is claimed is:

1. A method comprising:
   determining risks of simultaneous theft of a primary device and respective ones of a plurality of satellite devices associated with the primary device; and
   identifying at least one of the satellite devices as an appropriate authentication factor for use in an authentication process involving the primary device based at least in part on a comparison of a specified threshold and the determined risk of simultaneous theft of the primary device and the identified at least one satellite device;
   wherein determining the risks of simultaneous theft of the primary device and respective one of the plurality of satellite devices associated with the primary device is based at least in part on risk assessments relating to use of the plurality of satellite devices as respective authentication factors in the authentication process involving the primary device; and
   wherein said determining and identifying are performed by at least one processing device comprising a processor coupled to a memory.

2. The method of claim 1 wherein said at least one processing device that performs said determining and identifying comprises the primary device.

3. The method of claim 1 wherein said at least one processing device that performs said determining and identifying comprises a server configured to communicate with the primary device.

4. The method of claim 1 further comprising utilizing information associated with the identified at least one satellite device in the authentication process to authenticate a user of the primary device.

5. The method of claim 4 wherein utilizing information associated with the identified at least one satellite device comprises utilizing at least one of a credential released by the satellite device, an output of a cryptographic function performed by the satellite device, and presence information of the satellite device.

6. The method of claim 1 wherein the identified at least one satellite device is configured for wireless communication with the primary device.

7. The method of claim 1 wherein determining the risks of simultaneous theft of the primary device and respective one of the plurality of satellite devices associated with the primary device comprises determining the risks based on analysis that takes place within a first time interval [T, T+A] and wherein the determined risks are treated as valid over a second time interval [T+A, T+A+B], where T, A and B denote specified time parameters.

8. The method of claim 1 wherein determining the risks of simultaneous theft of the primary device and respective ones of the plurality of satellite devices associated with the primary device comprises determining risk scores indicative of a likelihood of simultaneous theft of the primary device and respective ones of the plurality of satellite devices.

9. The method of claim 1 further comprising causing the identified at least one satellite device to release at least one credential.

10. The method of claim 1 wherein determining the risks of simultaneous theft of the primary device and respective one of the plurality of satellite devices associated with the primary device comprises classifying the satellite devices.

11. The method of claim 10 wherein classifying the satellite devices comprises classifying the satellite devices based on at least one of product type and model.

12. The method of claim 1 wherein determining the risks of simultaneous theft of the primary device and respective one of the plurality of satellite devices associated with the primary device comprises characterizing operational history of the satellite devices.

13. A computer program product comprising a non-transitory processor-readable storage medium having embodied therein one or more software programs, wherein the one or more software programs when executed cause said at least one processing device to perform the method of claim 1.

14. The method of claim 1 wherein determining the respective risks of simultaneous theft is based at least in part on one or more of:
respective functions associated with the primary device and the plurality of satellite devices;
respective records of signal transmissions from the plurality of satellite devices to the primary device; and
respective applications or services with which the plurality of satellite devices communicate.

15. A method comprising:
determining a risk of simultaneous theft of a primary device and at least one satellite device associated with the primary device; and
identifying said at least one satellite device as an appropriate authentication factor for use in an authentication process involving the primary device, based at least in part on the determined risk;
wherein determining the risk of simultaneous theft of the primary device and at least one satellite device associated with the primary device comprises determining a risk score indicative of a likelihood of simultaneous theft of the primary device and said at least one satellite device;
wherein determining the risk score comprises determining a plurality of separate risk scores for respective ones of a plurality of the satellite devices; and
wherein said determining and identifying are performed by at least one processing device comprising a processor coupled to a memory.

16. The method of claim 15 wherein identifying said at least one satellite device as an appropriate authentication factor comprises identifying any of the plurality of satellite devices having respective risk scores that exceed respective specified thresholds as appropriate authentication factors for use in the authentication process.

17. The method of claim 15 wherein determining the risk score comprises determining a composite risk score for the plurality of satellite devices using the respective separate risk scores.

18. The method of claim 17 wherein identifying said at least one satellite device as an appropriate authentication factor comprises identifying all of the plurality of satellite devices as appropriate authentication factors for use in the authentication process if the composite risk score exceeds a specified threshold.

19. An apparatus comprising:
a server configured to communicate with at least one primary device;
wherein the server comprises a processor coupled to a memory and is configured to determine risks of simultaneous theft of the primary device and respective ones of a plurality of satellite devices of the primary device, and to identify at least one of the satellite devices as an appropriate authentication factor for use in an authentication process involving the primary device based at least in part on a comparison of a specified threshold and the determined risk of simultaneous theft of the primary device and the identified at least one satellite device;
wherein determining the risks of simultaneous theft of the primary device and respective one of the plurality of satellite devices associated with the primary device is based at least in part on risk assessments relating to use of the plurality of satellite devices as respective authentication factors in the authentication process involving the primary device.

20. An apparatus comprising:
a primary device configured to communicate with plurality of satellite devices;
wherein the primary device comprises a processor coupled to a memory and is configured to determine risks of simultaneous theft of the primary device and respective ones of the plurality of satellite devices, and to identify at least one of the satellite devices as an appropriate authentication factor for use in an authentication process involving the primary device based at least in part on a comparison of a specified threshold and the determined risk of simultaneous theft of the primary device and the identified at least one satellite device;
wherein determining the risks of simultaneous theft of the primary device and respective one of the plurality of satellite devices associated with the primary device is based at least in part on risk assessments relating to use of the plurality of satellite devices as respective authentication factors in the authentication process involving the primary device.

21. The apparatus of claim 20 wherein the primary device is configured to utilize information associated with the identified at least one satellite device in the authentication process to authenticate a user of the primary device.

22. The apparatus of claim 21 wherein the information associated with the identified at least one satellite device comprises at least one of a credential released by the satellite device, an output of a cryptographic function performed by the satellite device, and presence information of the satellite device.

23. The apparatus of claim 20 wherein the primary device is configured for wireless communication with the plurality of satellite devices.

24. The apparatus of claim 23 wherein the primary device is configured to determine a plurality of separate risk scores for respective ones of the plurality of satellite devices.

25. The apparatus of claim 20 wherein the primary device comprises a mobile telephone and the identified at least one satellite device comprises a device configured for wireless communication with the mobile telephone using a near-field communication protocol.

26. The apparatus of claim 20 wherein the primary device comprises a portable computer and the identified at least one satellite device comprises a device configured for wireless communication with the portable computer using a near-field communication protocol.

* * * * *

UNITED STATES PATENT AND TRADEMARK OFFICE
CERTIFICATE OF CORRECTION

PATENT NO.         : 8,850,609 B1                                    Page 1 of 1
APPLICATION NO.    : 13/625480
DATED              : September 30, 2014
INVENTOR(S)        : Ari Juels It is certified that error appears in the above-identified patent and that said Letters Patent is hereby corrected as shown below:

In the specification:

In the detailed description of the invention:

Column 8, line 29, after "more particularly" please change "involve comprises" to --comprise--

Column 8, line 57, please change "enable" to --enabled--

Column 9, line 46, after "a secret key" please change "is" to --κ--

Column 9, line 66, after "look up in" please change "on" to --an--

In the claims:

Claim 1, column 10, line 52, please change "respective one" to --respective ones--

Claim 7, column 11, line 15, please change "respective one" to --respective ones--

Claim 10, column 11, line 32, please change "respective one" to --respective ones--

Claim 12, column 11, line 39, please change "respective one" to --respective ones--

Claim 19, column 12, line 40, please change "respective one" to --respective ones--

Claim 20, column 12, line 60, please change "respective one" to --respective ones--

Signed and Sealed this
Sixth Day of January, 2015

Michelle K. Lee
*Deputy Director of the United States Patent and Trademark Office*